(12) United States Patent
Fukami et al.

(10) Patent No.: US 8,532,570 B2
(45) Date of Patent: Sep. 10, 2013

(54) WIRELESS COMMUNICATION DEVICE AND WIRELESS COMMUNICATION SYSTEM

(75) Inventors: Tadashi Fukami, Kanagawa (JP); Tomoyuki Hiura, Kanagawa (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 12/538,569

(22) Filed: Aug. 10, 2009

(65) Prior Publication Data

US 2010/0048144 A1 Feb. 25, 2010

(30) Foreign Application Priority Data

Aug. 19, 2008 (JP) .................................. 2008-210513

(51) Int. Cl.
*H04B 5/00* (2006.01)
*H04B 7/00* (2006.01)

(52) U.S. Cl.
USPC .......................... 455/41.1; 455/41.2; 455/41.3

(58) Field of Classification Search
USPC ............... 455/41.1, 41.2, 552.1, 553.1, 426.1
See application file for complete search history.

(56) References Cited

U.S. PATENT DOCUMENTS

| | | | |
|---|---|---|---|
| 4,584,707 A * | 4/1986 | Goldberg et al. | 455/41.2 |
| 5,966,444 A * | 10/1999 | Yuan et al. | 380/283 |
| 7,180,421 B2 | 2/2007 | Pahlaven et al. | |
| 7,352,998 B2 * | 4/2008 | Palin et al. | 455/41.2 |
| 8,005,426 B2 * | 8/2011 | Huomo et al. | 455/41.2 |
| 8,064,829 B2 * | 11/2011 | Matsuo et al. | 455/41.2 |
| 2002/0132585 A1 * | 9/2002 | Palermo et al. | 455/41 |
| 2004/0063458 A1 * | 4/2004 | Hori et al. | 455/554.2 |
| 2006/0232437 A1 * | 10/2006 | Gutowski et al. | 340/825.69 |
| 2008/0122650 A1 | 5/2008 | Shimo | |
| 2009/0146791 A1 * | 6/2009 | Jantunen et al. | 340/10.2 |

FOREIGN PATENT DOCUMENTS

| | | |
|---|---|---|
| GB | 2421663 A | 6/2006 |
| JP | 2005-333169 | 12/2005 |
| JP | 2006-229583 | 8/2006 |
| JP | 2008-035104 | 2/2008 |
| JP | 2008-131598 | 6/2008 |
| JP | 2008-521287 | 6/2008 |
| WO | 2006055431 A2 | 5/2006 |

OTHER PUBLICATIONS

Japanese Office Action for corresponding JP2008-210513 issued on Jun. 22, 2010.
Missoni et al., "Dual Frequency Comprehensive Transponder with Inverse Load Modulation", www.eurasip.org, Sep. 24, 2007, pp. 1-4.
European Search Report dated Sep. 29, 2010 corresponding to European Patent Appln. No. 09167701.
European Patent Office, Communication pursuant to Article 94(3) EPC issued in connection with European Patent Application No. 09 167 701.3, dated Nov. 2, 2012. (4 pages).

* cited by examiner

*Primary Examiner* — Yuwen Pan
*Assistant Examiner* — Ayodeji Ayotunde
(74) *Attorney, Agent, or Firm* — K&L Gates LLP

(57) ABSTRACT

A wireless communication device is provided and includes: a first data communication unit performing communication by an electromagnetic induction system, a second data communication unit performing communication at higher speed than the first communication unit by using a system and/or a communication frequency band different from the first data communication unit, and a control unit controlling communication operations of the first data communication unit and the second data communication unit. The control unit performs communication by using the second data communication unit while a carrier signal is transmitted from the first data communication unit.

8 Claims, 6 Drawing Sheets

FIG.6

WIRELESS COMMUNICATION DEVICE AND WIRELESS COMMUNICATION SYSTEM

CROSS REFERENCES TO RELATED APPLICATIONS

The present application claims priority to that disclosed in Japanese Priority Patent Application JP 2008-210513 filed in the Japan Patent Office on Aug. 19, 2008, the entire contents of which is hereby incorporated by reference.

BACKGROUND

In related arts, a non-contact type communication system, for example, a non-contact type IC (Integrated Circuit) card system includes an IC card and a wireless communication device which reads information from the IC card, in which near-field data communication (for example, within 30 cm) can be performed.

In the IC card system, as described in JP-A-2008-35104 (Patent Document 1), when the IC card comes close to the wireless communication device, power is supplied to the IC card by the electromagnetic induction system using electromagnetic waves generated by the wireless communication device. The IC card and the wireless communication device have antenna coils respectively, and these antenna coils come close to each other, thereby performing data communication in an electromagnetically coupled state. For example, the wireless communication device modulates a carrier signal having a given frequency based on a read command with respect to the IC card and generates electromagnetic waves by voltage being applied to the antenna coil in accordance with the modulated carrier signal. At this time, the IC card can obtain the read command from the current change generated at the antenna coil due to the electromagnetic waves. The IC card also reads data corresponding to the read command from a storage unit and changes resistance or capacitance to be a load based on the data to thereby change a demagnetizing field generated from the antenna coil. At this time, the wireless communication device detects the change of a voltage value generated in the antenna coil due to the demagnetizing field, thereby obtaining data transmitted from the IC card.

In the communication system using the electromagnetic induction system, the frequency of the carrier signal is 13.56 MHz and communication speed is 106 Kbps or 212 Kbps. Accordingly, when contents having a large amount of data such as images are transmitted, it is difficult to transmit contents in real time.

Thus, it is desirable to provide a wireless communication device and a wireless communication system capable of performing data communication using the electromagnetic induction system as well as data communication at higher speed than the former data communication.

SUMMARY

The present disclosure relates to a wireless communication device and a communication system. Particularly, the disclosure relates to a device and a system in which data communication using an electromagnetic induction system as well as data communication at higher speed than the former data communication can be performed by using a data communication unit performing communication by the electromagnetic induction system and a data communication unit performing communication at high speed by using a system and/or a communication frequency band different from the former data communication unit.

According to an embodiment, there is provided a wireless communication device including a first data communication unit performing communication by an electromagnetic induction system, a second data communication unit performing communication at higher speed than the first communication unit by using a system and/or a communication frequency band different from the first data communication unit and a control unit controlling communication operations of the first data communication unit and the second data communication unit, in which the control unit performs communication by using the second data communication unit while a carrier signal is transmitted from the first data communication unit.

In the embodiment, the first data communication unit performs communication by the electromagnetic induction system and the second data communication unit performs communication by, for example, a back scatter system which is a radio wave system as the system different from the electromagnetic induction system. The first data communication unit realizes communication by the electromagnetic induction system with an opponent wireless communication device by transmitting the carrier signal.

When communication is started at the second data communication unit, the opponent wireless communication device is allowed to radiate a non-modulated carrier signal by transmitting a transmission permission request from the first data communication unit to the opponent wireless communication device. The second data communication unit performs communication by receiving the non-modulated carrier signal radiated from the opponent wireless communication device and transmitting a reflected-wave signal modulated based on data to be transmitted.

According to another embodiment, there is provided a wireless communication device including a third data communication unit performing communication by an electromagnetic induction system, a fourth data communication unit performing communication at higher speed than the third communication unit by using a system and/or a communication frequency band different from the third data communication unit, a control unit controlling communication operations of the third data communication unit and the fourth data communication unit and a power veneration unit receiving a carrier signal transmitted by the electromagnetic induction system and generating power from the carrier signal to supply power, in which the control unit performs communication by using the fourth data communication unit while the carrier signal is received at the third data communication unit.

In the embodiment, the third data communication unit performs communication by the electromagnetic induction system and the fourth data communication unit performs communication by, for example, the back scatter system which is the radio wave system as the system different from the electromagnetic induction system. The power generation unit generates power from the carrier signal received at the third data communication unit and supplies power to, for example, the third data communication unit, the fourth data communication unit and the control unit. Additionally, the fourth data communication unit radiates a non-modulated carrier signal when receiving a transmission start request at the third data communication unit. The fourth data communication unit generates reception data by receiving a modulated reflected-wave signal.

According to another embodiment, there is provided a wireless communication system including a first wireless communication device having a first data communication unit performing communication by an electromagnetic induction system, a second data communication unit performing communication at higher speed than the first communication unit by using a system and/or a communication frequency band different from the first data communication unit and a control unit controlling communication operations of the first data communication unit and the second data communication unit, and a second wireless communication device having a third data communication unit performing communication by the electromagnetic induction system, a fourth data communication unit performing communication at higher speed than the third communication unit by using a system and/or a communication frequency band different from the third data communication unit, a control unit controlling communication operations of the third data communication unit and the fourth data communication unit, and a power generation unit receiving a carrier signal transmitted by the first data communication unit of the first wireless communication device and generating power from the carrier signal to supply power, in which the control unit of the first wireless communication device performs transmission of a carrier signal from the first data communication unit, and in which the control units of the first and second wireless communication devices perform communication between the first wireless communication device and the second wireless communication device by using the second data communication unit and the fourth data communication unit during transmission of the carrier signal.

In the embodiment, the first and second wireless communication devices perform communication by the electromagnetic induction system and by, for example, the back scatter system different from the electromagnetic induction system. The first data communication system in the first wireless communication device can perform communication with an opponent wireless communication device by the electromagnetic induction system. The power generation unit of the second wireless communication device generates power from the carrier signal received at the third data communication unit and supplies power to, for example, the third data communication unit, the fourth data communication unit and the control unit. The first wireless communication device transmits a transmission permission request from the first data communication unit when communication is started at the second data communication unit. The second wireless communication device radiates a non-modulated carrier signal from the fourth data communication unit when the transmission permission request is received at the third data communication unit. The second data communication unit of the first wireless communication device receives the non-modulated carrier signal radiated from the second wireless communication device and transmits a reflected-wave signal modulated based on data to be transmitted. The fourth data communication unit of the second wireless communication device obtains reception data by receiving the reflected-wave signal modulated at the second data communication unit. Accordingly, high-speed communication is performed between the second data communication unit and the fourth communication unit. After that, when completion notification of the high-speed communication is transmitted from the third data communication unit to the first data communication unit, the first data communication unit completes transmission of the carrier signal.

According to the embodiments, there are provided a data communication unit performing communication by an electromagnetic induction system, a high-speed data communication unit performing communication at high speed by using a system and/or a communication frequency band different from the data communication unit and a control unit, in which communication is performed by the control unit by using the high-speed data communication unit during transmission of a carrier signal from the data communication unit. Accordingly, data communication using the electromagnetic induction system as well as data communication higher than the former data communication can be performed.

Additional features and advantages are described herein, and will be apparent from the following Detailed Description and the figures.

DETAILED DESCRIPTION

Hereinafter, an embodiment will be explained with reference to the drawings. An wireless communication device according to the embodiment includes a data communication unit performing a near-field non-contact communication by using an electromagnetic induction system and a data communication unit performing the near-field non-contact communication at higher speed by using a system and/or a communication frequency band different from the former data communication unit.

The data communication unit (hereinafter, referred to as a "low-speed data communication unit") performing communication by using the electromagnetic induction system performs communication by ASK (Amplitude Shift Keying) modulating a carrier signal having a frequency of 13.56 MHz. On the other hand, the data communication unit (hereinafter, referred to as a "high-speed data communication unit") performing the near-field non-contact communication which is higher speed than the low-speed data communication unit performs communication by using, for example, a radio wave system. As the radio wave system, for example, a communication system called as a weak UWB (Ultra Wide Band) which uses a communication frequency band of 4.48 GHz, a backscatter system which can realize low power consumption and the like can be cited. Alternatively, a baseband broadband communication is performed in the electromagnetic induction system. It is also preferable that communication is performed by using a waveform equalization high-speed communication and the like.

Figure 1:
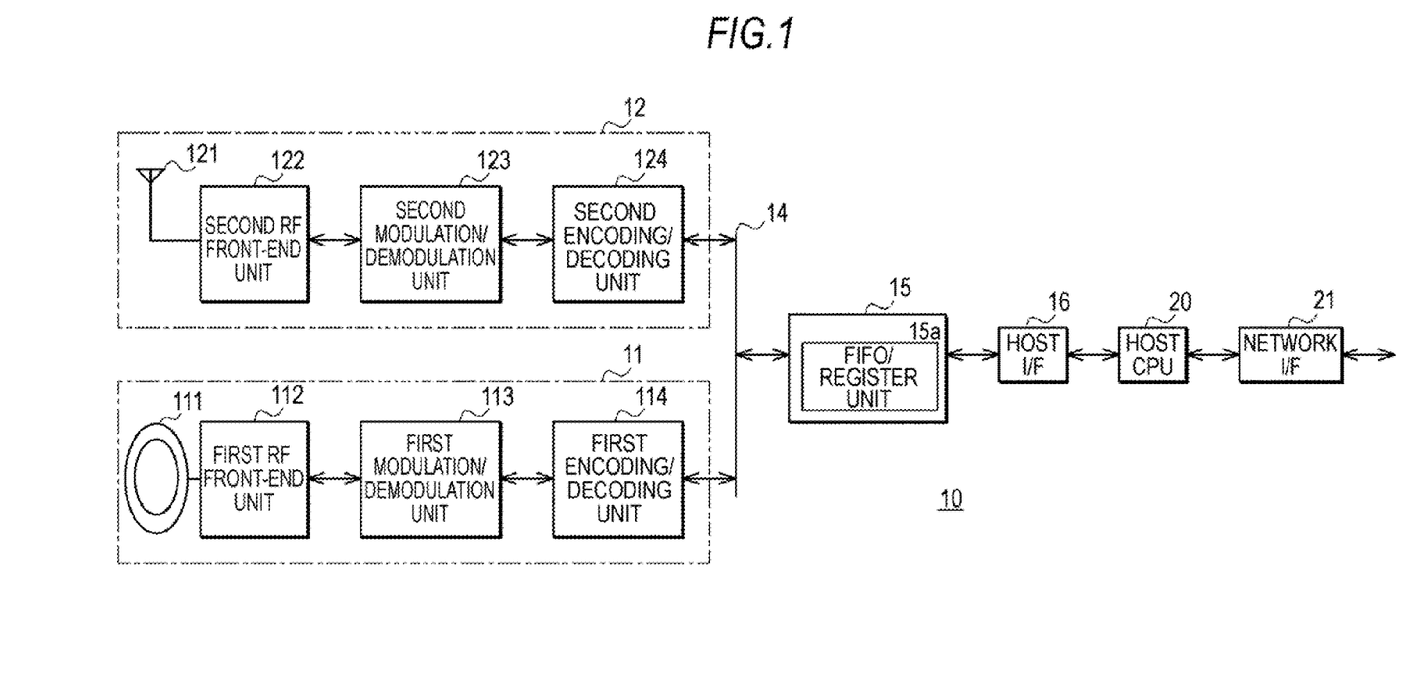
FIG. 1 is a diagram showing a configuration of a transmission-side wireless communication device.

FIG. 1 shows a configuration of a transmission-side wireless communication device 10. In the configuration of the wireless communication device 10, the radio wave system is used in the high-speed data communication unit.

In the wireless communication device 10, a low-speed data communication unit (first data communication unit) 11 includes an antenna 111, a first RF front-end unit 112, a first modulation/demodulation unit 113, and a first encoding/decoding unit 114.

The antenna 111 is an antenna for performing non-contact communication by using the electromagnetic induction system, which is made by using an antenna coil. The antenna 111 generates a magnetic field corresponding to a transmission signal which is a modulated carrier signal or a non-modulated carrier signal supplied from the first RF front-end unit 112. Additionally, the antenna 111 is electromagnetically coupled with an antenna of a reception-side wireless communication device, supplying a carrier signal modulated by the reception-side wireless communication device to the first RF front-end unit 112 as a reception signal.

The first RF front-end unit 112 amplifies the transmission signal supplied from the first modulation/demodulation unit 113 and supplies the signal to the antenna 111. The first RF front-end unit 112 also removes noise of the reception signal supplied from the antenna 111 and amplifies the signal, then, supplies the signal to the first modulation/demodulation unit 113.

The first modulation/demodulation unit 113 modulates the carrier signal based on encoded data supplied from the first encoding/decoding unit 114, supplying the modulated carrier signal to the first RF front-end unit 112 as the transmission signal. The first modulation/demodulation unit 113 also demodulates the reception signal supplied from the first RF front-end unit 112, supplying the obtained demodulated data to the first encoding/decoding unit 114. In the first modulation/demodulation unit 113, for example, the ASK modulation/demodulation is performed.

The first encoding/decoding unit 114 performs encoding processing of transmission data supplied from a system controller 15, generating encoded data and supplies the data to the first modulation/demodulation unit 113. The first encoding/decoding unit 114 also performs decoding processing of demodulated data supplied from the first modulation/demodulation unit 113, supplying the obtained decoded data to the system controller 15 as reception data. In the first encoding/decoding unit 114, Manchester encoding is used as the encoding/decoding method.

A high-speed data communication unit (second data communication unit) 12 performs communication at higher speed than the low-speed data communication unit 11 by using the radio wave system. The high-speed data communication unit 12 includes an antenna 121, a second RF front-end unit 122, a second modulation/demodulation unit 123 and a second encoding/decoding unit 124.

The antenna 121 is an antenna for performing non-contact communication by using the radio wave system. For example, when the UWB system is used in the wireless communication device 10, the antenna 121 transmits a transmission signal supplied from the second RF front-end unit 122 as a radio signal (radio waves). The antenna 121 also supplies a reception signal obtained by receiving a radio signal to the second RF front-end unit 122. For example, when the back scatter system is used in the wireless communication device 10, the antenna 121 receives a radio signal radiated from the reception-side wireless communication device and reflects the signal by switching a phase in accordance with the transmission signal.

The second RF front-end unit 122 amplifies the transmission signal supplied from the second modulation/demodulation unit 123 and supplies the signal to the antenna 121. The second RF front-end unit 122 also removes noise of the reception signal supplied from the antenna 121 and amplifies the signal, then, supplies the signal to the second modulation/demodulation unit 123. When the back scatter system is used, the second RF front-end unit 122 reflects a radio signal received by the antenna 121 by switching the phase based on the transmission signal supplied from the second modulation/demodulation unit 123.

The second modulation/demodulation unit 123 modulates encoded data supplied from the second encoding/decoding unit 124, generating a transmission signal and supplying the signal to the second RF front-end unit 122. The second modulation/demodulation unit 123 demodulates the reception signal supplied from the second RF front-end unit 122, supplying the obtained demodulated data to the second encoding/decoding unit 124. In the second modulation/demodulation unit 123, for example, QPSK (Quandrature Phase Shift Keying) modulation/demodulation or the like is performed.

The second encoding/decoding unit 124 performs encoding processing of transmission data supplied from the system controller 15, generating encoded data and supplying the data to the second modulation/demodulation unit 123. The second encoding/decoding unit 124 also performs decoding processing of demodulated data supplied from the second modulation/demodulation unit 123, supplying the obtained decoded data to the system controller 15 as reception data. In the second encoding/decoding unit 124, an NRL-L (Non Return to Zero-Level) method is used as an encoding/decoding method.

The system controller 15 included in a control unit of the wireless communication device 10 is connected to the first encoding/decoding unit 114 and the second encoding/decoding unit 124 through a bus 14. The system controller 15 is also connected to a host CPU (Central Processing Unit) 20 through a host interface (I/F) 16. In the system controller 15, a FIFO (First In First Out)/register unit 15a is provided. The control unit includes the system controller 15, the host CPU 20 and the like.

The system controller 15 writes communication setting information supplied from the host CPU 20 through the host interface 16 in the register of the FIFO/register unit 15a. The system controller 15 determines a transmission method, a transmission rate and the like based on the communication setting information written in the register of the FIFO/register unit 15a, generating a communication control command and the like for performing data communication using the high-speed data communication unit and supplying the command to the first encoding/decoding unit 114. The system controller 15 further writes transmission data supplied from the host CPU 20 through the host interface 16 in the FIFO of the FIFO/register unit 15a. The system controller 15 supplies the transmission data written in the FIFO to the second encoding/decoding unit 124.

The host CPU 20 can be connected to an external server and the like through a network interface (I/F) 21, acquiring content data and the like from the server. The host CPU 20 also controls the system controller 15 to perform processing of transmitting the acquired content data and the like to the reception-side wireless communication device.

Figure 2:
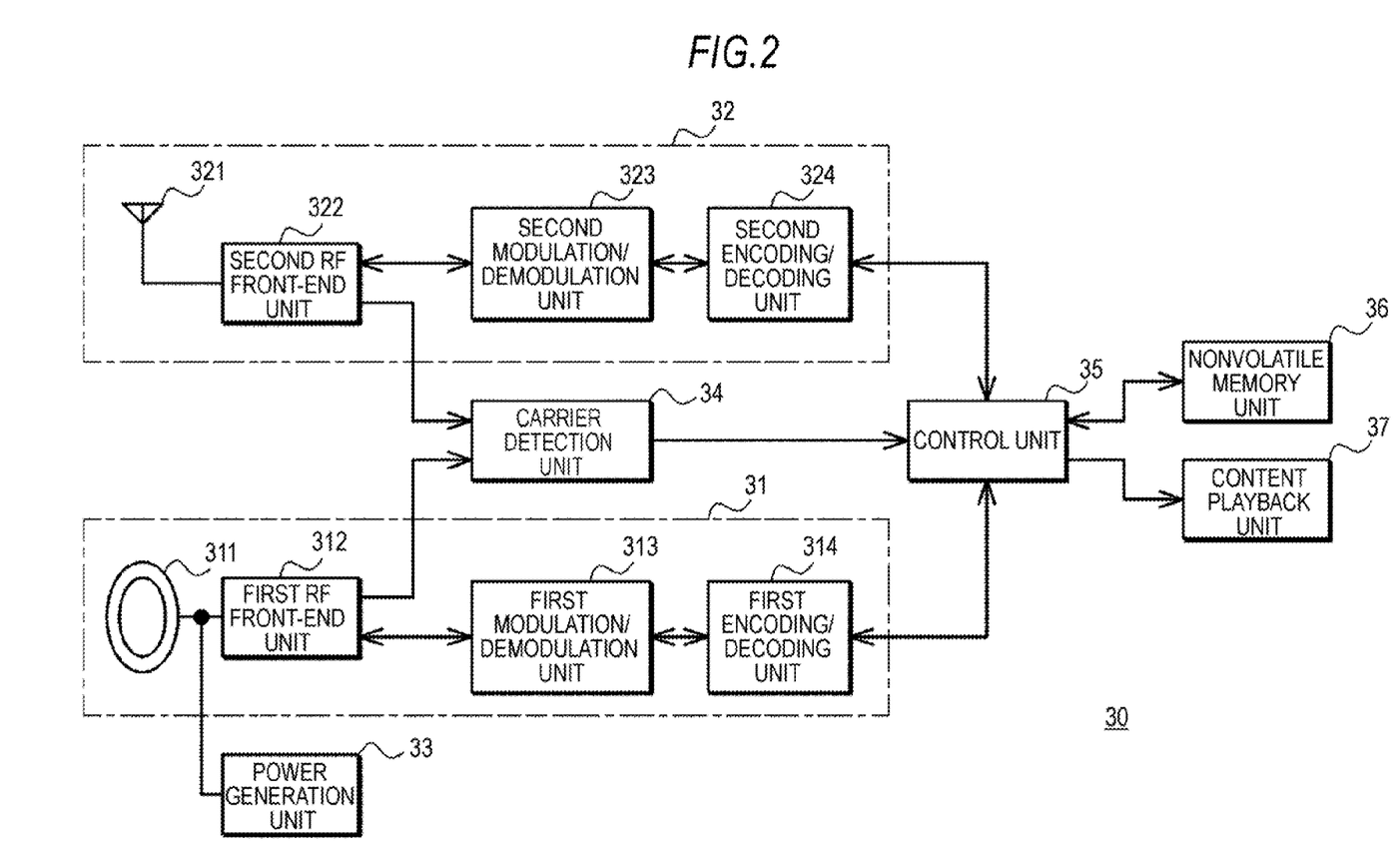
FIG. 2 is a diagram showing a configuration of a reception-side wireless communication device.

FIG. 2 shows a configuration of a reception-side wireless communication device 30. In the configuration of the wireless communication device 30, the radio wave system is used as the high-speed data communication unit so as to correspond to the above wireless communication device 10.

In the wireless communication device 30, a low-speed data communication unit (third data communication unit) 31 includes an antenna 311, a first RF front-end unit 312, a first modulation/demodulation unit 313, a first coding/decoding unit 314.

The antenna 311 is an antenna for performing non-contact communication by using the electromagnetic induction system, which is made by using the antenna coil. The antenna 311 is electromagnetically coupled with the antenna of the transmission-side wireless communication device, supplying a reception signal generated by the electromagnetic coupling to the first RF front-end unit 312 and a power generation unit 33.

The first RF front-end unit 312 modulates a non-modulated carrier signal transmitted from the transmission-side wireless communication device in accordance with a transmission signal supplied from the first modulation/demodulation unit 313 by using the antenna 311. The first RF front-end unit 312 also removes noise of the reception signal supplied from the antenna 311 and amplifies the signal, then, supplies the signal to the first modulation/demodulation unit 313 and a carrier detection unit 34.

The first modulation/demodulation unit 313 performs modulation processing of encoded data supplied from the first encoding/decoding unit 314, generating the transmission signal and supplying the signal to the first RF front-end unit 312. The first modulation/demodulation unit 313 also performs demodulation of the reception signal supplied from the first RF front end unit 312, supplying the obtained demodulated data to the first encoding/decoding unit 314. The first modulation/demodulation unit 313 performs, for example, the ASK modulation/demodulation so as to correspond to the transmission-side wireless communication device.

The first encoding/decoding unit 314 performs encoding processing of transmission data supplied from a control unit 35, generating encoded data and supplying the data to the first modulation/demodulation unit 313. The first encoding/decoding unit 314 also performs decoding processing of demodulated data supplied from the first modulation/demodulation unit 313, supplying the obtained decoded data to the control unit 35 as reception data. In the first encoding/decoding unit 314, Manchester encoding is used as the encoding/decoding method so as to correspond to the transmission-side wireless communication device.

A high-speed data communication unit (fourth data communication unit) 32 performs communication at higher speed than the low-speed data communication unit 31 by using the radio wave system. The high-speed data communication unit 32 includes an antenna 321, a second RF front-end unit 322, a second modulation/demodulation unit 323 and a second encoding/decoding unit 324.

The antenna 321 is an antenna for performing non-contact communication by using the radio wave system. For example, when the UWB system is used in the wireless communication device 30, the antenna 321 transmits a transmission signal supplied from the second RF front-end unit 322 as a radio signal (radio waves). The antenna 321 also supplies a reception signal obtained by receiving a radio signal to the second RF front-end unit 322. For example, when the back scatter system is used in the wireless communication device 30, the antenna 321 radiates a non-modulated carrier signal as a radio signal (radio waves) so as to transmit data from the transmission-side wireless communication device. The antenna 321 further receives a reflected-wave signal which is a radio signal reflected by the transmission-side wireless communication device, supplying the reception signal obtained by receiving the reflected-wave signal to the second RF front end unit 322.

The second RF front end unit 322 supplies the transmission signal supplied from the second modulation/demodulation unit 323 to the antenna 321. The second RF front end unit 322 also removes noise of the reception signal supplied from the antenna 321 and amplifies the signal, then, supplies the signal to the second modulation/demodulation unit 323.

The second modulation/demodulation unit 323 modulates encoded data supplied from the second encoding/decoding unit 324, generating the transmission signal and supplying the signal to the second RF front end unit 322. The second modulation/demodulation unit 323 also demodulates the reception signal supplied from the second RF front end unit 322, supplying the obtained demodulated data to the second encoding/decoding unit 324. When the back scatter system is used, the second modulation/demodulation unit 323 supplies a non-modulated carrier signal to the second RF front end unit 322 as the transmission signal so as to transmit data from the transmission-side wireless communication device. In the second modulation/demodulation unit 323, for example, the QPSK modulation/demodulation or the like is performed so as to correspond to the transmission-side wireless communication device.

The second encoding/decoding unit 324 performs encoding processing of transmission data supplied from the control unit 35, generating encoded data and supplying the data to the second modulation/demodulation unit 323. The second encoding/decoding unit 324 performs decoding processing of demodulated data supplied from the second modulation/demodulation unit 323, supplying the obtained decoded data to the control unit 35 as reception data. In the second encoding/decoding unit 324, for example, the NRZ-L method is used so as to correspond to the transmission-side wireless communication device.

The power generation unit 33 performs power generation by rectifying the reception signal supplied from the antenna 311, supplying the power to respective units of the wireless communication device 30 to allow the wireless communication device 30 to operate.

The carrier detection unit 34 detects whether a carrier signal is supplied from the first RF front end unit 312 or not as well as whether a carrier signal is supplied from the second RF front end unit 322 or not, supplying detected results to the control unit 35.

The control unit 35 controls operations of the low-speed data communication unit 31 and the high-speed data communication unit 32 in accordance with detection results of the carrier. For example, the control unit 35 reads information requested from the transmission-side wireless communication device 10 from a nonvolatile memory unit 36, performing processing of transmitting the data from the low-speed data communication unit 31. The control unit 35 also acquires content data and the like from the transmission-side wireless communication device 10 by using the high-speed data communication unit 32. The control unit 35 further supplies the acquired content data and the like to a content playback unit 37 to thereby allow the content playback unit 37 to play back the content data and the like.

Figure 3:
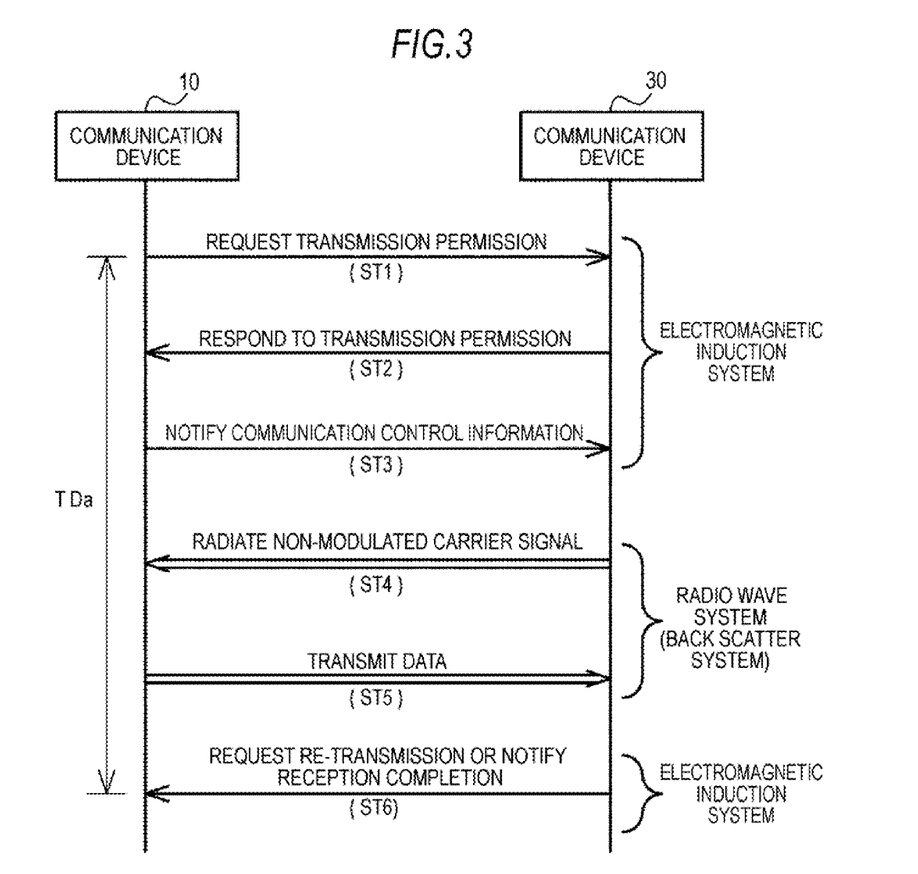
FIG. 3 is a sequence diagram showing communication operations of wireless communication devices.

Next, communication operations of the transmission-side wireless communication device and the reception-side wireless communication device will be explained with reference to FIG. 3. In the following description, high-speed communication is performed by using the back scatter system.

The transmission-side wireless communication device 10, when performing data communication with the reception-side wireless communication device 30 at high speed, requests the reception-side wireless communication device 30 to permit transmission by the electromagnetic induction system (ST1).

The host CPU 20 of the wireless communication device 10 writes communication control information in the register of the FIFO/register unit 15a when transmitting content data and the like to the wireless communication device 30. The system controller 15 allows the low-speed data communication unit 11 to start operation based on the communication control information written in the register of the FIFO/register unit 15a and allows the unit to transmit a modulated carrier signal indicating the request for transmission permission from the antenna 111 as a transmission signal. The host CPU 20 supplies a non-modulated carrier signal to the antenna 111 as a transmission signal until the reception completion notification is supplied from the wireless communication device 30 even while data communication is performed so that the near-field non-contact communication using the electromagnetic induction system can be performed. A period TDa indicates a period during which near-field non-contact communication using the electromagnetic induction system can be performed.

When a reception signal, namely, a non-modulated carrier signal or a modulated carrier signal is received by the antenna 311 of the wireless communication device 30, the power generation unit 33 rectifies the carrier signal to generate power, supplying the generated power to respective units to operate the low-speed data communication unit 31, the carrier detection unit 34 and the control unit 35 of the wireless communication device 30. The low-speed data communication unit 31 performs modulation of the received modulated carrier signal and performs decoding of modulated data, supplying the obtained reception data to the control unit 35. That is, the request for transmission permission transmitted from the wireless communication device 10 is supplied to the control unit 35.

The reception-side wireless communication device 30 makes a response to transmission permission when permitting communication using the high-speed data communication unit (ST2).

The control unit 35 of the wireless communication device 30 generates a response of transmission permission and supplies the response to the low-speed data communication unit 31 when permitting communication using the high-speed data communication unit. The low-speed data communication unit 31 performs encoding and modulation of transmission data indicating the response of transmission permission to generate a transmission signal. The low-speed data communication unit 31 also modulates the non-modulated carrier signal transmitted from the transmission-side wireless communication device in accordance with the transmission signal.

The low-speed data communication unit 11 of the wireless communication device 10 performs demodulation and decoding of the carrier signal modulated in the reception-side wireless communication device 30, supplying the obtained reception data to the system controller 15. That is, the response of transmission permission transmitted from the wireless communication device 30 is supplied to the system controller 15.

The system controller 15 of the wireless communication device 10 performs notification of the communication control information based on the response of transmission permission from the wireless communication device 30 (ST3).

The system controller 15 of the wireless communication device 10 reads communication control information written in the register of the FIFO/register unit 15a and supplies the information to the low-speed data communication unit 11.

Figure 4:
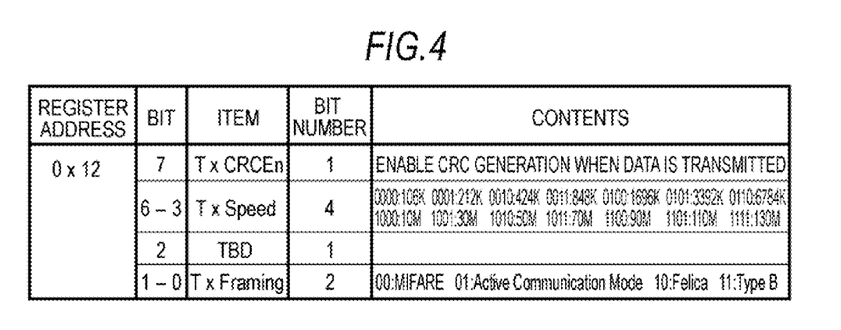
FIG. 4 is a chart exemplifying communication control information.

FIG. 4 shows communication control information written in the register of the FIFO/register unit 15a as an example. For example, a register "0x12" is a register showing a transmission mode, in which information indicating transmission speed and a data format when performing communication using the high-speed data communication unit is written by the host CPU 20.

"TxCRCEn" of the highest bit "7" in the register "0x12" indicates whether CRC generation is performed or not at the time of transmitting data. "TxSpeed" of bits "6 to 3" indicates transmission speed. For example, when the bits "6 to 3" are "0000", speed is 106 kbit/s, when they are "0001", speed is 212 kbit/s and so on. The bit "2" indicates "TBD (To Be Determined)", which is an undetermined bit at present. "TxFraming" of bits "1, 0" indicates what data format is used. For example, "00" indicates a data format compliant with a standard of MIFARE (trademark) and "10" indicates a data format compliant with a standard of FeliCa (trademark).

The low-speed data communication unit 11 of the wireless communication device 10 performs encoding and modulation of communication control information, generating a modulated carrier signal indicating communication control information and transmitting the signal from the antenna 111. The low-speed data communication unit 31 of the wireless communication device 30 receives the modulated carrier signal transmitted from the antenna 111, performing the demodulation and decoding of the modulated carrier signal and supplying the obtained reception data to the control unit 35. That is, the communication control information transmitted from the wireless communication device 10 is supplied to the control unit 35.

The control unit 35 of the wireless communication device 30 performs setting of data communication using the high-speed data communication unit based on the communication control information, allowing the antenna 321 of the high-speed data communication unit 32 to radiate a non-modulated carrier signal as a radio signal so as to perform high-speed data communication with the wireless communication device 10 (ST4). When the communication control information includes information indicating data size, it is possible to complete data communication operation using the high-speed data communication unit when data reception of the size indicated by the communication control information is completed.

The control unit 35 of the wireless communication device 30 controls operation of the high-speed data communication unit 32 so as to perform data communication with the wireless communication device 10 by the transmission speed and the format indicated by the communication control information. The control unit 35 also allows the antenna 321 to radiate a non-modulated carrier signal of, for example, 2.45 GHz so as to perform high-speed data communication with the wireless communication device 10.

The high-speed data communication unit 12 of the wireless communication device 10 performs data transmission by using the non-modulated carrier signal radiated from the wireless communication device 30 (ST5).

The system controller 15 of the wireless communication device 10 writes high-speed communication data supplied from the host CPU 20 in the FIFO of the FIFO/register unit 15a sequentially. The system controller 15 also reads high-speed communication data written in the FIFO sequentially and supplies the data to the high-speed data communication unit 12 as transmission data. The high-speed data communication unit 12 switches the phase of the non-modulated carrier signal radiated from the wireless communication device 30 and reflects the signal based on the transmission signal generated by performing encoding and modulation of transmission data.

The high-speed data communication unit 32 of the wireless communication device 30 receives the reflected-wave signal from the wireless communication device 10. The high-speed data communication unit 32 performs modulation and decoding of the reception signal obtained by receiving the reflected-wave signal, supplying the obtained reception data to the control unit 35. The control unit 35 stores the reception data in, for example, the nonvolatile memory unit 36. When the reception data is, for example, content data, and the received content is played back, the control unit 35 supplies the reception data to the content playback unit 37.

The wireless communication device 30 requests the wireless communication device 10 to re-transmit data when there is data which has not been received. The wireless communication device 30 notifies the wireless communication device 10 of the reception completion when the reception data having the size notified in advance is obtained (ST6).

The control unit 35 of the wireless communication device 30 supplies the request for re-transmitting data which has not been received to the low-speed data communication unit 31 when there is data which has not been received. When the data reception is completed, the control unit 35 supplies the reception completion notification to the low-speed data communication unit 31. The low-speed data communication unit 31 performs encoding and modulation of transmission data indicating the request for re-transmission or the reception completion notification to generate a transmission signal. The low-speed data communication unit 31 modulates the non-modulated carrier signal from the transmission-side wireless communication device in accordance with the transmission signal. The control unit 35 further completes operation of the high-speed data communication unit 32 to stop radiation of the non-modulated carrier signal when the data reception is completed.

The low-speed data communication unit 11 of the wireless communication device 10 performs demodulation and decoding of the carrier signal modulated in the reception-side wireless communication device 30, supplying the obtained reception data from the system controller 15 to the host CPU 20. That is, the request for re-transmission and the reception completion notification transmitted from the wireless communication device 30 are transmitted to the host CPU 20.

The host CPU 20, of the wireless communication device 10, when the request for re-transmission is supplied, supplies data which has not been received by the wireless communication device 30 to the high-speed data communication unit 12 and transmits the data again. When the reception completion notification is supplied, the host CPU 20 completes operation of the low-speed data communication unit 11 to stop the supply of the non-modulated carrier signal to the antenna 111. The control of re-transmission processing of data and processing of stopping supply of the non-modulation carrier signal may be performed by the system controller 15.

Figure 5:
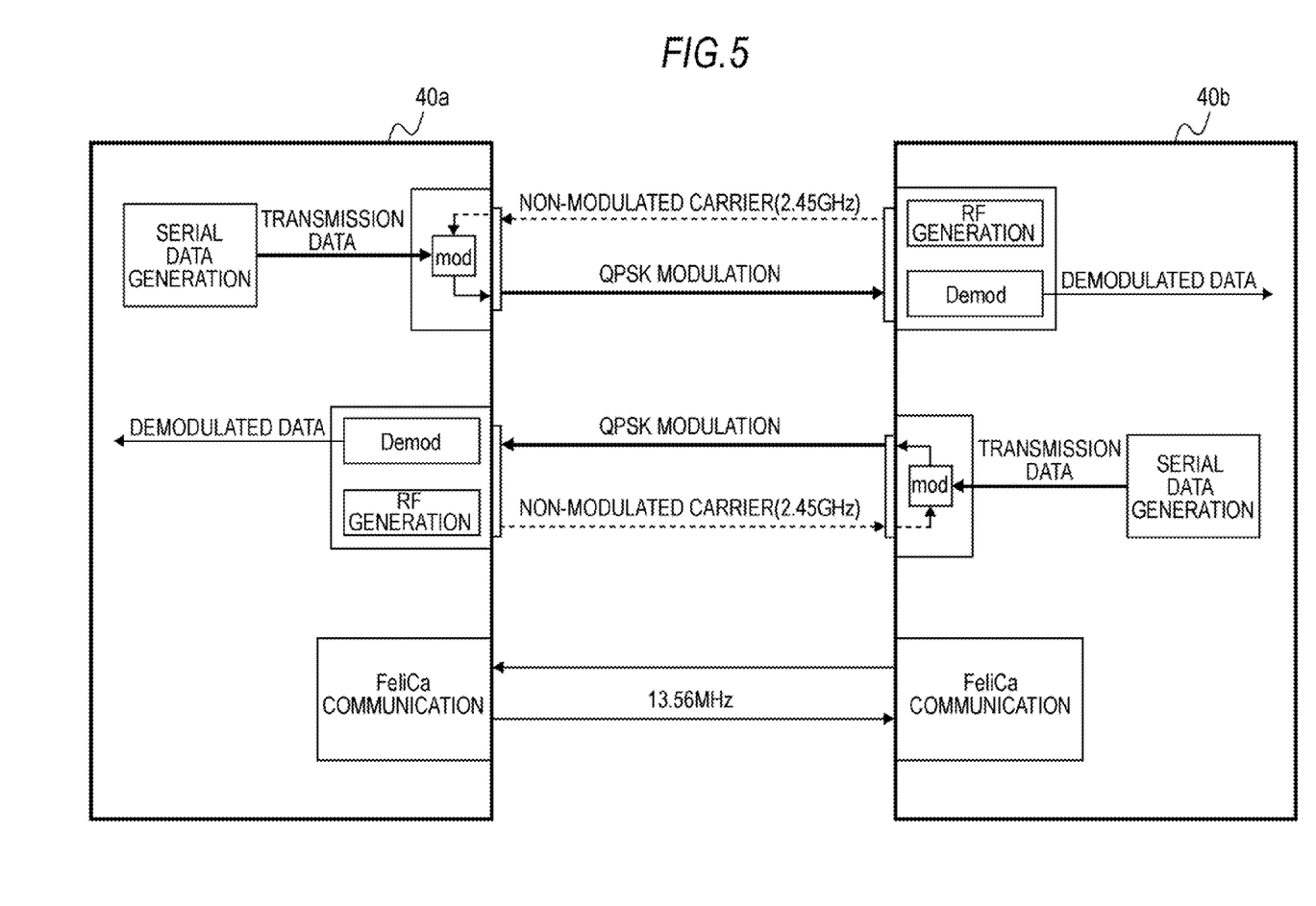
FIG. 5 is a diagram showing states of mutual communication between wireless communication devices.

FIG. 5 shows a state of mutual communication between wireless communication devices with respective circuit blocks.

Two wireless communication devices 40a, 40b perform near-field non-contact communication using a carrier signal of 13.56 MHz by the electromagnetic induction system, for example, the Felica (trademark) system. In the near-field non-contact communication by the electromagnetic induction system, communication of communication control information concerning the near-field non-contact communication by the radio wave system is performed, which is higher speed than the electromagnetic induction system.

When the back scatter system is used as the radio wave system, a transmission-side wireless communication device switches the phase of a radio signal radiated from a reception-side wireless communication device in accordance with a transmission signal and reflects the signal. For example, the wireless communication device 40a modulates the phase of a radio signal as a non-modulated carrier signal of 2.45 GHz radiated from the wireless communication device 40b in accordance with transmission data generated in a serial data generation unit, generating a reflected-wave signal as a carrier signal which received the QPSK modulation. The wireless communication device 40b performs demodulation and the like of the reception signal obtained by receiving the reflected-wave signal, thereby obtaining demodulated data which is equal to transmission data. When the same processing is performed by radiating the radio signal as the non-modulated carrier signal from the wireless communication device 40a, demodulated data which is equal to transmission data generated in a serial data generation unit of the wireless communication device 40b can be obtained in the wireless communication device 40a.

As described above, the low-speed data communication unit performing the near-field non-contact communication by using the electromagnetic induction system and the high-speed data communication unit performing high speed near-field non-contact communication by using the system and/or the communication frequency band different from the low-speed data communication unit are provided, thereby performing not only data communication using the low-speed data communication unit but also data communication at higher speed than the data communication. Therefore, rewriting information read from information stored in a card such as an IC card in related arts can be performed, and further, communication of contents having large data volume such as music or moving pictures can be performed at short time.

Additionally, communication is performed by using the high-speed data communication unit during transmission of the carrier signal from the low-speed data communication unit, therefore, communication using the low-speed data communication unit as well as high-speed communication using the high-speed data communication unit can be performed. Accordingly, the high-speed data communication can be controlled by the communication using the low-speed data communication unit, which enables optimization of data communication. For example, when the back scatter system is used in the high-speed data communication unit, radiation of the non-modulated carrier signal in the back scatter system is controlled by the communication using the low-speed data communication unit. According to the operation, it is possible to radiate the non-modulated carrier signal from the reception-side wireless communication device only when the high-speed data communication is performed, as a result, data communication can be performed while preventing unnecessary power consumption.

Furthermore, since the communication is used by using the high-speed data communication unit during transmission of the carrier signal from the low-speed data communication unit, when power is generated by using the carrier signal received at the reception-side wireless communication device, it is possible to perform communication by using the high-speed data communication without providing a power supply for supplying power to the high-speed data communication unit, as a result, the wireless communication device can be provided inexpensively.

Figure 6:
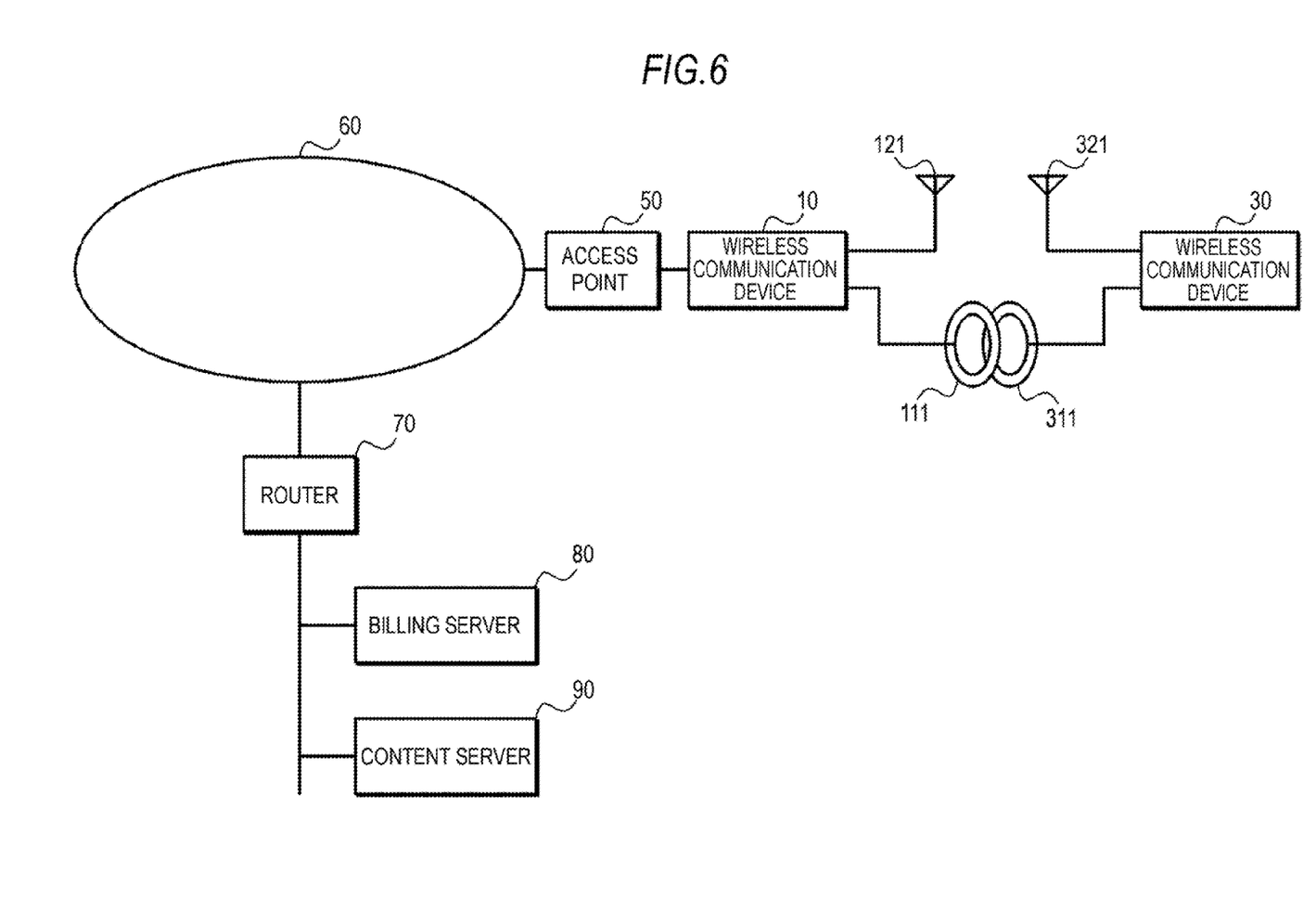
FIG. 6 is a diagram showing a configuration of a communication system performing delivery of pay contents.

Next, a specific example of communication operations in the transmission-side wireless communication device 10 and the reception-side wireless communication device 30 will be explained with reference to FIG. 6 and FIG. 7. FIG. 6 shows a configuration of a communication system which performs delivery of contents. As contents, music, moving and still pictures, information desired by a user (for example, information of preferable stores, shopping history, traffic information, maps and landscapes of destinations and the like) and so on can be cited. In the following explanation, contents will be provided with charge.

In the communication system, the wireless communication device 10 is connected to an access point 50 through a wired or wireless transmission path. The access point 50 is connected to a router 70 through a network 60. To the router 70, a billing server 80 which bills the user of pay contents, and a content server 90 in which content data of pay contents is stored are connected.

The wireless communication device 10 acquires content data from the content server 90 and transmits data to the wireless communication device 30. The wireless communication device 30 is provided with a prepaid payment function, which can settle the charge generated at the time of acquiring content data of the pay content.

Figure 7:
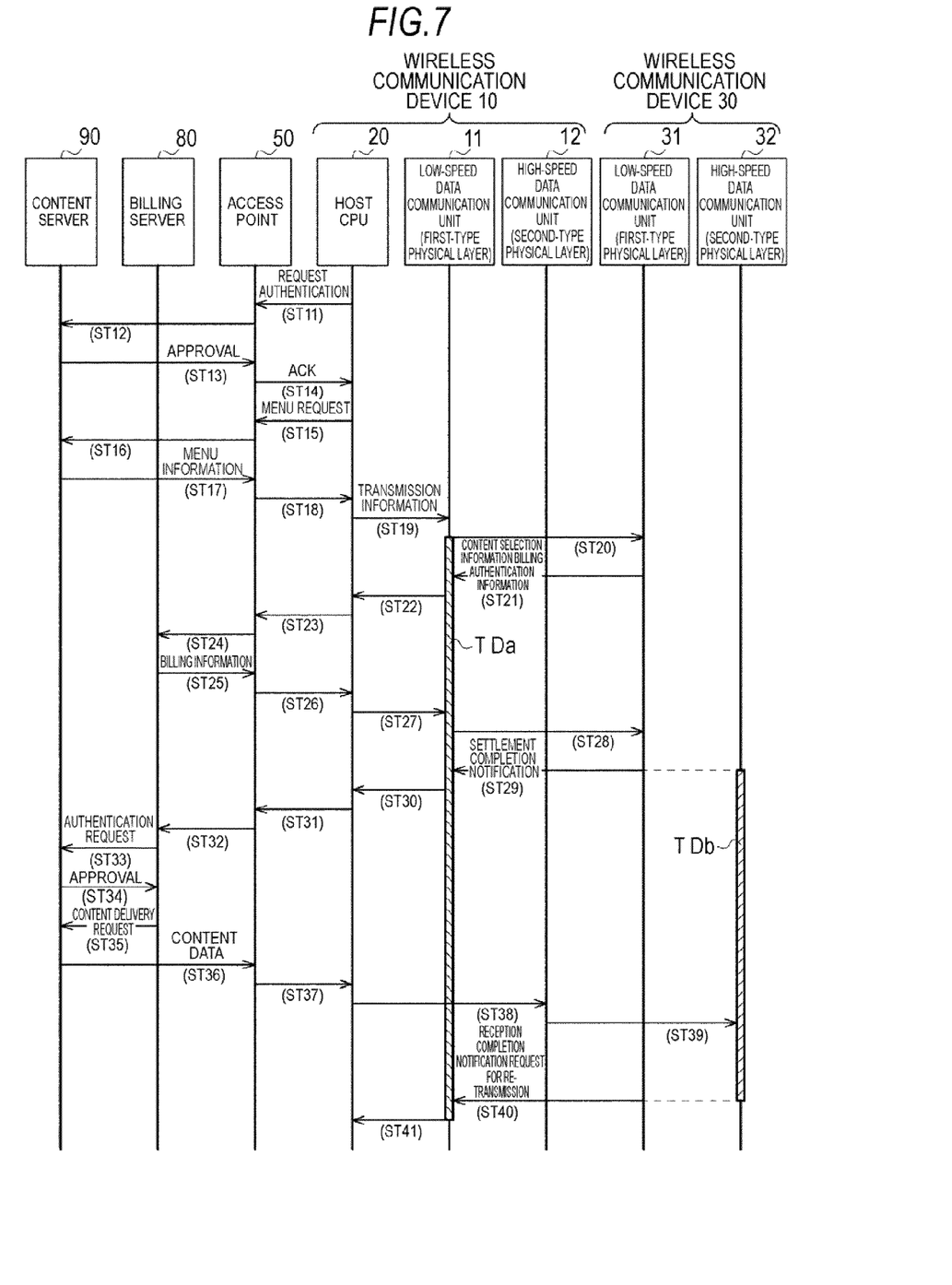
FIG. 7 is a sequence diagram showing communication operations at the time of performing a delivery operation of pay contents.

FIG. 7 shows a sequence of communication operations at the time of performing a delivery operation of pay contents. The host CPU 20 of the transmission-side wireless communication device 10 requests authentication for acquiring content data from a content provider to the access point (AP) 50 (ST11).

The access point 50 transmits authentication request to the content server 90 (ST12). The access point 50 uses a protocol which encrypts information to be received and transmitted for transmitting authentication request completely.

The content server 90 determines whether the supplied authentication request is from a normal user or not, giving approval to the normal user (ST13).

When the approval is given by the content server 90, the access point 50 supplies an ACK to the host CPU 20 of the wireless communication device 10 (ST14).

The host CPU 20 supplies a menu request with respect to the content server 90 to the access point 50 based on the approval by the content server 90 (ST15).

The access point 50 transfers the menu request to the content server 90 (ST16).

The content server 90 outputs requested menu information to the access point 50 (ST17).

The access point 50 transfers supplied menu information to the host CPU 20 (ST18).

The host CPU 20 of the wireless communication device 10 generates transmission information for performing menu display and the like and supplies the information to the low-speed data communication unit 11 (ST19). The transmission information may include information indicating a selection instruction of contents, transfer speed, data volume and the like of content data.

The low-speed data communication unit 11 performs near-field non-contact communication by the electromagnetic induction system with the low-speed data communication unit 31 of the wireless communication device 30, supplying the transmission information from the wireless communication device 10 to the wireless communication device 30 (ST20). The low-speed data communication unit 11 supplies the non-modulated carrier signal to the antenna 111 as a transmission signal until communication completion instruction is issued from the CPU 20 even when data transmission is not performed so that the near-field non-contact communication by the electromagnetic induction system can be performed. A period TDa represented by oblique lines shows a period during which the near-field non-contact communication by the electromagnetic induction system can be performed.

When the selection of contents is performed by, for example, the user, the low-speed data communication unit 31 of the wireless communication device 30 transmits content selection information indicating the selected content and billing authentication information for identifying the wireless communication device 30 including the prepaid payment function to the wireless communication device 10 by the near-field non-contact communication by the electromagnetic induction system (ST21). The wireless communication device 30 performs encryption of information to be transmitted for transmitting billing authentication information and the like safely.

The low-speed data communication unit 11 of the wireless communication device 10 supplies the content selection information and the billing authentication information supplied from the wireless communication device 30 to the host CPU 20 (ST22).

The host CPU 20 transmits the content selection information and the billing authentication information supplied from the wireless communication device 30 to the access point 50 (ST23).

The access point 50 transfers the content selection information and the billing authentication information supplied from the wireless communication device 10 to the billing server 80 by using the protocol which encrypts information to be received and transmitted (ST24).

The billing server 80 performs authentication of the wireless communication device 30 including the prepaid payment function based on the billing authentication information. The billing server 80, when approving the wireless communication device 30, generates billing information indicating a charge to be necessary for providing the content indicated by the content selection information and supplies the information to the access point 50 (ST25).

The access point 50 supplies the billing information to the wireless communication device 10 (ST26).

The host CPU 20 of the wireless communication device 10 supplies the billing information to the low-speed data communication unit 11, thereby transmitting the information to the low-speed data communication unit 31 of the wireless communication device 30 by the near-field non-contact communication by the electromagnetic induction system (ST27, ST28).

The wireless communication device 30 settles an account by subtracting the charge indicated by the billing information from the stored balance. When the settlement has been completed, the wireless communication device 30 transmits settlement completion notification from the low-speed data communication unit 31 to the low-speed data communication unit 11 of the wireless communication device 10 by the near-field non-contact communication by the electromagnetic induction system (ST29). Since the settlement has been completed, the wireless communication device 30 radiates a non-modulated carrier signal from the high-speed data communication unit 32 as a radio signal so that content data can be transmitted at high speed from the wireless communication device 10 to the wireless communication device 30 by the near-field non-contact communication of the radio wave system. A period TDb represented by oblique lines show a period during which the near-field non-contact communication of the radio wave system can be performed by radiating the non-modulated carrier signal.

The low-speed data communication unit 11 of the wireless communication device 10 supplies settlement completion notification supplied from the wireless communication device 30 to the host CPU 20 (ST30).

The host CPU 20 transmits the settlement completion notification supplied from the wireless communication device 30 to the access point 50 (ST31).

The access point 50 transfers the settlement completion notification supplied from the wireless communication device 10 to the billing server 80 by using the protocol which encrypts information to be received and transmitted (ST32).

The billing server 80 transmits an authentication request to the content server 90 when the settlement completion notification is supplied (ST33).

The content server 90 determines whether the supplied authentication request is a request from the normal billing server or not, giving approval to the normal server (ST34).

When the approval is given by the content server 90, the billing server 80 supplies a content delivery request to the content server 90 so that delivery of content data indicated by the content selection information is performed to the wireless communication device 10 at which the charge has been adjusted (St35).

The content server 90 transmits content data requested to be delivered to the access point 50 (ST36). The content server 90 uses the protocol which encrypts information to be received and transmitted for transmitting content data safely.

The access point 50 transfers the content data supplied from the content server 90 to the wireless communication device 10 (ST37).

The host CPU 20 of the wireless communication device 10 supplies the supplied content data to the high-speed data communication unit 12 (ST38).

The high-speed data communication unit 12 transmits the content data to the low-speed data communication unit 31 of the wireless communication device 30 by the near-field non-contact communication by the radio wave system (ST39). The wireless communication device 30 supplies the content data received at the low-speed data communication unit 31 to the non-volatile memory unit 36 to be stored therein. The wireless communication device 30 may also supply the content data to the content playback unit 37 to allow the content to be played back.

After that, the wireless communication device 30 transmits a request for re-transmission of data from the low-speed data communication unit 31 to the low-speed data communication unit 11 of the wireless communication device 10 by the near-field non-contact communication by using the electromagnetic induction system when there is data which has not been received. The reception of the content data is completed, the wireless communication device 30 transmits reception completion notification from the low-speed data communication unit 31 to the low-speed data communication unit 11 of the wireless communication device 10 by the near-field non-contact communication by using the electromagnetic induction system (ST40). The wireless communication device 30 stops the radiation of the non-modulated carrier signal from the low-speed data communication unit 31 when the reception of the content data is completed.

The low-speed data communication unit 11 of the wireless communication device 10 supplies the request for re-transmission or the reception completion notification of data to the host CPU 20 (ST41). When there is no need for performing communication with the wireless communication device 30 after receiving the reception completion notification from the wireless communication device 30, the host CPU 20 instructs the low-speed data communication unit 11 to complete communication, allowing the low-speed data communication unit 11 to stop output of the non-modulated carrier signal to the antenna 111. When the carrier signal is stopped, generation of power in the power generation unit of the wireless communication device 30 is stopped accordingly, as a result, operation of the wireless communication device 30 is completed. Also, when the request for re-transmission is supplied, the host CPU 20 supplies the request for re-transmission to the content server 90 through the access point 50, acquiring the data which has not been received from the content server 90 and supplying the data to the wireless communication device 30.

According to the above procedure, not only the high-speed data communication, optimization of data communication and the like can be realized as described above, but also content data of pay contents acquired by using the payment function which has been performed in related arts by the near-field non-contact communication by the electromagnetic induction system can be transmitted from the transmission-side wireless communication device to the reception-side wireless communication device at high speed by the near-field non-contact communication.

According to the wireless communication device and the wireless communication system, it is possible to perform data communication using the electromagnetic induction system as well as data communication higher than the former data communication by using the data communication unit which performs communication by the electromagnetic induction system and the data communication unit performing communication at higher speed by using the system and/or the communication frequency band different from the former data communication unit. Therefore, the embodiments are suitable for a case in which contents having large data volume such as music and moving pictures are transmitted in the non-contact manner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wireless communication device comprising:
   a first data communication unit configured to perform direct communication with a second wireless communication device by an electromagnetic induction system;
   a second data communication unit configured to perform direct communication with the second wireless communication device at a higher speed than the first communication unit by using a system or a communication frequency band different from the first data communication unit; and
   a control unit configured to control communication operations of the first data communication unit and the second data communication unit, and
   wherein the control unit performs direct communication by using the first data communication unit to establish transmission permission and provide notification of communication control information, and using the second data communication unit while a carrier signal is transmitted from the first data communication unit.

2. The wireless communication device according to claim 1,
   wherein a radio wave system is used as a system different from the electromagnetic induction system.

3. The wireless communication device according to claim 2,
   wherein the second data communication unit performs communication by back scatter which receives a non-modulated carrier signal radiated from an opponent wireless communication device and transmits a reflected-wave signal modulated based on data to be transmitted.

4. The wireless communication device according to claim 3,
   wherein the control unit enables the opponent wireless communication device to radiate the non-modulated carrier signal by transmitting a transmission permission request from the first data communication unit to the opponent wireless communication device when communication is started at the second data communication unit.

5. A wireless communication device comprising:
a first data communication unit configured to perform direct communication with a second wireless communication device by an electromagnetic induction system;
a second data communication unit configured to perform direct communication with the second wireless communication device at a higher speed than the first communication unit by using a system or a communication frequency band different from the first data communication unit;
a carrier detection unit configured to supply a carrier detection result;
a control unit configured to receive the carrier detection result from the carrier detection unit and configured to control communication operations of the first data communication unit and the second data communication unit based on the carrier detection result;
a power generation unit receiving a carrier signal transmitted by the electromagnetic induction system of the first data communication unit and generating power from the carrier signal to supply power,
wherein the control unit performs direct communication by using the first data communication unit to establish transmission permission and provide notification of communication control information, and using the second data communication unit while the carrier signal is received at the first data communication unit.

6. The wireless communication device according to claim 5,
wherein a radio wave system is used as a system different from the electromagnetic induction system.

7. The wireless communication device according to claim 6,
wherein the control unit radiates a non-modulated carrier signal from the second data communication unit when receiving a transmission start request at the first data communication unit, and the second data communication unit receives a modulated reflected-wave signal to generate reception data.

8. A wireless communication system comprising:
a first wireless communication device including:
a first data communication unit configured to perform direct communication with a second wireless communication device by an electromagnetic induction system,
a second data communication unit configured to perform direct communication with the second wireless communication device at a higher speed than the first communication unit by using a system or a communication frequency band different from the first data communication unit, and
a first control unit configured to control communication operations of the first data communication unit and the second data communication unit; and
the second wireless communication device including:
a third data communication unit configured to perform direct communication with the first wireless communication device by the electromagnetic induction system,
a fourth data communication unit configured to perform direct communication with the first wireless communication device at a higher speed than the third communication unit by using a system or a communication frequency band different from the third data communication unit,
a carrier detection unit configured to supply a carrier detection result,
a second control unit configured to receive the carrier detection result from the carrier detection unit and configured to control communication operations of the third data communication unit and the fourth data communication unit based on the carrier detection result, and
a power generation unit configured to receive a carrier signal transmitted by the electromagnetic induction system of the first data communication unit of the first wireless communication device and generating power from the carrier signal to supply power,
wherein the first control unit of the first wireless communication device performs transmission of a carrier signal from the first data communication unit, and
wherein the first and second control units of the first and second wireless communication devices perform direct communication between the first wireless communication device and the second wireless communication device by using the first data communication unit and third data communication unit to establish transmission permission and provide notification of communication control information, and using the second data communication unit and the fourth data communication unit during transmission of the carrier signal.

* * * * *